US012681349B2

(12) United States Patent
Zhu

(10) Patent No.: US 12,681,349 B2
(45) Date of Patent: Jul. 14, 2026

(54) QUANTUM DOT OPTICAL PLATE HAVING HIGH BRIGHTNESS AND BLOCKING BLUE LIGHT AND PREPARATION METHOD THEREFOR, AND BACKLIGHT MODULE

(71) Applicants: Xiaobo Zhu, Guangzhou (CN);
CANNANO JIAYUAN (GUANGZHOU) SCIENCE & TECHNOLOGY CO., LTD.,
Guangzhou (CN)

(72) Inventor: Xiaobo Zhu, Guangzhou (CN)

(73) Assignees: Xiaobo Zhu, Guangzhou (CN);
CANNANO JIAYUAN (GUANGZHOU) SCIENCE & TECHNOLOGY CO., LTD.,
Guangzhou (CN)

( * ) Notice: Subject to any disclaimer, the term of this patent is extended or adjusted under 35 U.S.C. 154(b) by 344 days.

(21) Appl. No.: 18/690,496

(22) PCT Filed: Aug. 30, 2022

(86) PCT No.: PCT/CN2022/115941
§ 371 (c)(1),
(2) Date: Mar. 8, 2024

(87) PCT Pub. No.: WO2023/036019
PCT Pub. Date: Mar. 16, 2023

(65) Prior Publication Data
US 2025/0130462 A1     Apr. 24, 2025

(30) Foreign Application Priority Data
Sep. 8, 2021     (CN) .......................... 202111049133.4

(51) Int. Cl.
*G02F 1/1335* (2006.01)
*G02F 1/13357* (2006.01)

(52) U.S. Cl.
CPC .. *G02F 1/133614* (2021.01); *G02F 1/133606* (2013.01); *G02F 1/133611* (2013.01)

(58) Field of Classification Search
None
See application file for complete search history.

(56) References Cited

U.S. PATENT DOCUMENTS

| 5,903,391 A | 5/1999 | Toshima et al. |
| 2004/0253427 A1 | 12/2004 | Yokogawa et al. |

(Continued)

FOREIGN PATENT DOCUMENTS

| CN | 103228983 A | 7/2013 |
| CN | 103765250 A | 4/2014 |

(Continued)

OTHER PUBLICATIONS

The First Office Action of the counterpart JP application No. 2024-515599 issued on Jan. 28, 2025.

(Continued)

*Primary Examiner* — Jyotsna V Dabbi
(74) *Attorney, Agent, or Firm* — The Sun IP Law

(57)     ABSTRACT

Disclosed are a quantum dot optical plate having high brightness and blocking blue light and a preparation method therefor, and a backlight module. The quantum dot optical plate includes a light diffusion layer, a quantum dot layer and a brightening layer arranged in sequence, a first light transition layer is arranged between the quantum dot layer and the light diffusion layer, a second light transition layer is arranged between the quantum dot layer and the brightening layer, refractive indexes of the light diffusion layer, the first light transition layer, the quantum dot layer, the second light transition layer and the brightening layer satisfy:
$t_{light\ diffusion\ layer} \leq t_{first\ light\ transition\ layer} \leq t_{quantum\ dot\ layer} \leq t_{second\ light\ transition\ layer} \leq t_{brightening\ layer}$, a first rough par- (Continued)

ticle is laid between the light diffusion layer and the first light transition layer, a second rough particle is laid between the brightening layer and the second light transition layer.

20 Claims, 1 Drawing Sheet

(56) References Cited

U.S. PATENT DOCUMENTS

| 2012/0113672 A1* | 5/2012 | Dubrow | G02B 6/0055 |
| | | | 977/774 |
| 2014/0022819 A1 | 1/2014 | Oh et al. | |
| 2020/0257035 A1* | 8/2020 | Kuksenkov | G02B 6/0055 |
| 2021/0167310 A1 | 6/2021 | You et al. | |
| 2022/0075229 A1* | 3/2022 | Walker | G02F 1/133614 |

FOREIGN PATENT DOCUMENTS

| CN | 104950518 | A | 9/2015 | | |
| CN | 106094328 | A | 11/2016 | | |
| CN | 107452853 | A | 12/2017 | | |
| CN | 207037298 | U | 2/2018 | | |
| CN | 108388050 | A | 8/2018 | | |
| CN | 108712966 | A | 10/2018 | | |
| CN | 108803141 | A | * 11/2018 | | G02F 1/1336 |
| CN | 109849388 | A | 6/2019 | | |
| CN | 110471207 | A | * 11/2019 | | G02F 1/133528 |
| CN | 210109369 | U | 2/2020 | | |
| CN | 211293322 | U | 8/2020 | | |
| CN | 112684633 | A | 4/2021 | | |
| CN | 113703226 | A | 11/2021 | | |
| JP | 2013544018 | A | 12/2013 | | |
| JP | 2017142360 | A | 8/2017 | | |
| KR | 20150089975 | A | 8/2015 | | |
| KR | 20170035688 | A | 3/2017 | | |
| KR | 20170051650 | A | 5/2017 | | |
| WO | 2020077614 | A1 | 4/2020 | | |

OTHER PUBLICATIONS

The Extend Search Report of the counterpart EP application No. 22866485.0 issued on Jul. 18, 2025.

* cited by examiner

QUANTUM DOT OPTICAL PLATE HAVING HIGH BRIGHTNESS AND BLOCKING BLUE LIGHT AND PREPARATION METHOD THEREFOR, AND BACKLIGHT MODULE

CROSS-REFERENCE TO RELATED APPLICATION

The disclosure is a National Stage Filing of the PCT International Application No: PCT/CN2022/115941 filed on 30 Aug. 2022, which claims priority to and the benefit of Chinese Patent Application No. 202111049133.4, filed to the China National Intellectual Property Administration (CHIPA) on 8 Sep. 2021, which is hereby incorporated by reference in its entirety.

TECHNICAL FIELD

The disclosure relates to the technical field of display and illumination, and in particularly to a quantum dot optical plate having high brightness and blocking blue light and a preparation method therefor, and a backlight module.

BACKGROUND

Quantum dot materials are applied in the field of display and illumination due to their wide excitation spectrum, narrow emission spectrum, high color purity, and desirable light stability. A color gamut of a quantum dot optical apparatus can be effectively enhanced, so the display effect of the apparatus is more vivid and dynamic.

However, the related art has the following drawbacks: (1) a single quantum dot diffusion plate can only satisfy the needs of a direct-lit backlight module, and cannot satisfy the needs of an edge-lit backlight module. This is because the quantum dot diffusion plate used in a direct-lit backlight module has a thickness roughly the same as that of an ordinary diffusion plate, which is generally 1.5 mm-2.0 mm, and if such a plate is directly used in an edge-lit module, it will cause the increasing of the thickness of this backlight module (an edge-lit backlight module has the advantage of being thinner and lighter than a direct-lit backlight module), and the edge-lit backlight module will lose its advantage. (2) A quantum dot light guide plate satisfies the needs for edge-lit backlight, but cannot satisfy the needs of a direct-lit backlight module. This is because an edge-lit backlight module needs to be combined with a light guide plate structure for using a quantum dot technology, and the light guide plate structure cannot be generalized to the direct-lit module at all, so the quantum dot light guide plate is suitable for an edge-lit backlight module, but may not necessarily satisfy the needs of a direct-lit module. (3) The cost of a quantum dot light conversion film assembly process can be generalized to edge-lit and direct-lit backlight modules, but the cost of use is high, which is because a water-oxygen barrier film in a quantum dot light conversion film has a very high manufacturing cost, so it is not suitable for a more comprehensive promotion.

CN109849388A provides a quantum dot optical functional plate and a preparation method therefor. The quantum dot optical functional plate includes a light gathering layer, a functional layer and a diffusion layer, the functional layer is arranged between the light gathering layer and the diffusion layer, and a surface of the light gathering layer facing away from the functional layer and a surface of the diffusion layer facing away from the functional layer are both provided with lines with preset shapes. In this technology, the light gathering layer, the functional layer and the diffusion layer constitute a formula and are subject to a co-extrusion in-mold composite process by a plurality of extruders, and then the surface is hot-pressed by a three-roll calender to generate preset microstructure lines, so the concealability and the brightness of the quantum dot optical functional plate can be improved. Moreover, the upper and lower layers of structures can protect the quantum dot functional layer so as to guarantee continuous and stable luminescence of the quantum dot.

CN108803141A provides a quantum dot integrated optical assembly, a backlight module and a liquid crystal display. A brightening film group and a diffusion plate are attached to two opposite surfaces of a quantum dot film layer respectively, so external water vapor and oxygen can be prevented from affecting the luminous performance of a quantum dot material, no barrier film with a complex structure needs to be used for encapsulating the quantum dot material, and the cost is reduced.

Although the above related art has overcome the shortcomings that a quantum dot light conversion film needs a high-cost water-oxygen barrier film, it lacks the design of light propagation paths through layers of structures, a light utilization rate is low, and the blue-light-blocking effect needs to be improved.

SUMMARY

An objective of the disclosure is to provide a quantum dot optical plate having high brightness and blocking blue light and a preparation method therefor, and a backlight module in order to overcome the defects in the related art that brightness and a blue-light-blocking effect of a quantum dot optical plate need to be improved and an application range is narrow. The quantum dot optical plate has the advantages of high brightness and blue light blockage, and the quantum dot optical plate has a wide application range, and is suitable for edge-lit and direct-lit backlight modules, needs no expensive water-oxygen barrier film, has a wide use range, and is convenient to assemble, such that a manufacturing cost of a backlight module device is reduced.

In order to achieve the above objective, some embodiments of the disclosure provide a quantum dot optical plate having high brightness and blocking blue light, including a light diffusion layer, a quantum dot layer and a brightening layer which are arranged in sequence, and a first light transition layer is arranged between the quantum dot layer and the light diffusion layer, a second light transition layer is arranged between the quantum dot layer and the brightening layer, refractive indexes of the light diffusion layer, the first light transition layer, the quantum dot layer, the second light transition layer and the brightening layer satisfy: $t_{light\ diffusion\ layer} \leq t_{first\ light\ transition\ layer} \leq t_{quantum\ dot\ layer} \leq t_{second\ light\ transition\ layer} \leq t_{brightening\ layer}$, and a first rough particle is laid between the light diffusion layer and the first light transition layer, and a second rough particle is laid between the brightening layer and the second light transition layer.

In some embodiments, the first light transition layer has a thickness of 0.01 mm-0.25 mm, the second light transition layer has a thickness of 0.01 mm-0.25 mm, and the quantum dot layer has a thickness of 0.1 mm-1.0 mm.

In some embodiments, the first light transition layer has the thickness of 0.01 mm-0.15 mm, the second light transition layer has the thickness of 0.01 mm-0.15 mm, and the quantum dot layer has the thickness of 0.1 mm-0.7 mm.

In some embodiments, a difference between a refractive index of the first rough particle and a refractive index of the first light transition layer is less than 0.01.

In some embodiments, a difference between a refractive index of the second rough particle and a refractive index of the brightening layer is less than 0.01.

In some embodiments, the first rough particle is made of the same resin material as a substrate of the first light transition layer.

In some embodiments, the second rough particle is made of the same resin material as a substrate of the brightening layer.

In some embodiments, when a refractive index difference between the light diffusion layer and the first light transition layer satisfies $0.1 \leq \delta t \leq 0.2$, the first rough particle has a particle size range of 0.1 mm-0.2 mm; when the refractive index difference between the light diffusion layer and the first light transition layer satisfies $0.01 < \delta t < 0.1$, the first rough particle has a particle size range of 0.01 mm-0.2 mm; and when the refractive index difference between the light diffusion layer and the first light transition layer satisfies $\delta t \leq 0.01$, the first rough particle has a particle size range of 0.001 mm-0.2 mm.

In some embodiments, when a refractive index difference between the brightening layer and the second light transition layer satisfies $0.1 \leq \delta t \leq 0.2$, the second rough particle has a particle size range of 0.1 mm-0.2 mm; when the refractive index difference between the brightening layer and the second light transition layer satisfies $0.01 < \delta t < 0.1$, the second rough particle has a particle size range of 0.01 mm-0.2 mm; and when the refractive index difference between the brightening layer and the second light transition layer satisfies $\delta t \leq 0.01$, the second rough particle has a particle size range of 0.001 mm-0.2 mm.

In some embodiments, a first quantum dot layer rough particle is laid between the quantum dot layer and the first light transition layer; and/or, a second quantum dot layer rough particle is laid between the quantum dot layer and the second light transition layer.

In some embodiments, a difference between a refractive index of the first quantum dot layer rough particle and a refractive index of a substrate of the quantum dot layer is less than 0.01, and a difference between a refractive index of the second quantum dot layer rough particle and a refractive index of the second light transition layer is less than 0.01.

In some embodiments, when a refractive index difference between the quantum dot layer and the first light transition layer satisfies $0.1 \leq \delta t \leq 0.2$, the first quantum dot layer rough particle has a particle size range of 0.1 mm-0.2 mm; when the refractive index difference between the quantum dot layer and the first light transition layer satisfies $0.01 < \delta t < 0.1$, the first quantum dot layer rough particle has a particle size range of 0.01 mm-0.2 mm; and when the refractive index difference between the quantum dot layer and the first light transition layer satisfies $\delta t \leq 0.01$, the first quantum dot layer rough particle has a particle size range of 0.001 mm-0.2 mm.

In some embodiments, when a refractive index difference between the quantum dot layer and the second light transition layer satisfies $0.1 \leq \delta t \leq 0.2$, the second quantum dot layer rough particle has a particle size range of 0.1 mm-0.2 mm; when the refractive index difference between the quantum dot layer and the second light transition layer satisfies $0.01 < \delta t < 0.1$, the second quantum dot layer rough particle has a particle size range of 0.01 mm-0.2 mm; and when the refractive index difference between the quantum dot layer and the second light transition layer satisfies $\delta t \leq 0.01$, the second quantum dot layer rough particle has a particle size range of 0.001 mm-0.2 mm.

In some embodiments, the first quantum dot layer rough particle is made of the same resin material as a substrate of the quantum dot layer, and the second quantum dot layer rough particle is made of the same resin material as a substrate of the second light transition layer.

In some embodiments, the quantum dot optical plate has a thickness of 0.2 mm-2 mm.

Some other embodiments of the disclosure provide a preparation method for the quantum dot optical plate having high brightness and blocking blue light above, including: step (1), measuring refractive indexes of a quantum dot layer, a light diffusion layer and a brightening layer, and selecting a photocurable adhesive and/or a hot melt adhesive as a first light transition layer adhesive and a second light transition layer adhesive according to a measurement result of the refractive indexes; step (2): coating the quantum dot layer with the adhesive layer by layer, to form a first light transition layer and a second light transition layer that have variable light refractive indexes; step (3): laying a first rough particle on the first light transition layer, and laying a second rough particle on the second light transition layer; and step (4): attaching the light diffusion layer to the first light transition layer, attaching the brightening layer to the second light transition layer, and performing ultraviolet curing and/or hot curing.

In some embodiments, between step (1) and step (2), the preparation method further includes:

laying a first quantum dot layer rough particle or a second quantum dot layer rough particle on a single side of the quantum dot layer; or laying the first quantum dot layer rough particle and the second quantum dot layer rough particle on two sides of the quantum dot layer respectively.

Still some other embodiments of the disclosure provide a backlight module, including the above quantum dot optical plate having high brightness and blocking blue light.

The quantum dot optical plate in the disclosure optimizes a transmission path of a light path in each layer in combination with the arrangement of the first rough particle and the second rough particle and by the above specific structural design, especially by designing the refractive indexes of various materials in the specific layers. The formed quantum dot optical plate has at least the following advantages:

1. When light passes through the quantum dot optical plate in this disclosure, a light loss is small, and the formed quantum dot optical plate has a high brightness. Specifically, in the related art, a refractive index difference between diaphragms is not considered, and the defects of large light offset distance and excessive light reflection exist when light is transmitted in different layers, which will lead to increase in light dispersion and decrease in light utilization rate when the light passes between the diaphragms. According to the disclosure, after light enters the quantum dot optical plate from an air layer, the light always enters an optically denser medium from an optically thinner medium in the structure, such that reflection of the light is reduced, meanwhile the offset distance of the light is reduced, and the light utilization rate is increased. When light passes through different flat interfaces, material properties and transparency of the flat interfaces are different, and the flat interfaces are easy to generate mirror reflection phenomenon. In this disclosure, the second rough particle is arranged, and the second quantum dot layer rough particle is further arranged, which increase roughness of a corresponding interface, so as to further reduce the reflection phenomenon of the light in a propagation process, and greatly reduce a loss of the light passing through the optical plate in cooperation with a change trend of the refractive indexes of the layers. More light is able to pass through the brightening layer, such that the brightening layer plays a better role, and achieves a better purpose of light equalization and brightening.

2. The quantum dot optical plate in the disclosure is able to effectively absorb blue light, and reduces output of blue light of an optical device while increasing a color gamut of the optical device. Specifically, in the disclosure, the first rough particle is arranged, and the first quantum dot layer rough particle is further arranged, so that roughness of both the light diffusion layer and the quantum dot layer are increased. By laying the rough particles and setting the refractive indexes of the layers, when light passes through a rough interface, a reflection amount of the light is reduced, a transmittance of the light is higher, and similarly, a transmittance of blue light is also higher. Furthermore, when the blue light enters the quantum dot layer through the rough surface, the rough surface is able to further provide multi-angle and multi-direction incident angles, such that the blue light is able to excite a quantum dot material in multi-directions, and the utilization rate of the quantum dot material to the blue light is increased. The backlight module using the structure in the disclosure has higher blue light transmittance and utilization rate, and uses less blue light to excite quantum dots, to achieve the same display effect. The blue light utilization rate in the disclosure is obviously better than that of an existing optical functional plate, an influence of blue light on a consumer is reduced, and an objective of protecting eyes is more effectively achieved.

3. The quantum dot optical plate in the disclosure has a wide application range and is able to be directly applied to various forms of backlight, for example, be applied to edge-lit and direct-lit backlight modules.

4. According to the disclosure, the light diffusion layer, the brightening layer and the quantum dot layer are integrated into a whole, a manufacturing cost is low, and the quantum dot optical plate is convenient for a terminal manufacturer to use, such that the terminal manufacturer saves a process and a cost of assembling the light diffusion layer and the brightening layer, intelligent assembly for the terminal manufacturer by using a robot, etc. becomes possible, multiple times of assembling a film and a plate is avoided, an assembly yield is increased, and an assembly cost is reduced. A quantum dot technology is used at low cost in each display terminal, a color gamut of liquid crystal display is enhanced, and the use and assembly cost of a television manufacturer is reduced.

Figure 1:
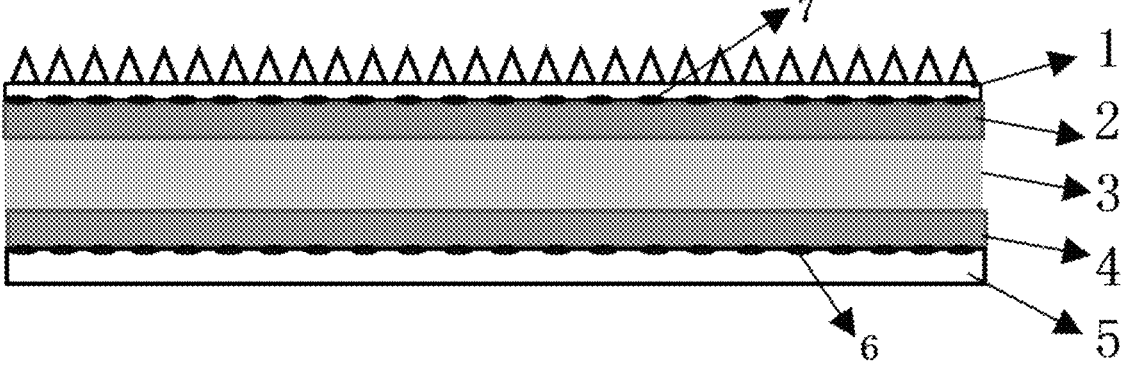
FIG. 1 is a structural schematic diagram of a quantum dot optical plate according to the disclosure.

DESCRIPTION OF REFERENCE NUMERALS 1, brightening layer; 2, second light transition layer; 3, quantum dot layer; 4, first light transition layer; 5, light diffusion layer; 6, first rough particle; 7, second rough particle; 8, first quantum dot layer rough particle; 9, second quantum dot layer rough particle.

DETAILED DESCRIPTION OF THE EMBODIMENTS

End points of ranges and any values disclosed herein are not limited to precise ranges or values, and such ranges or values should be understood to encompass values close to such ranges or values. For numerical ranges, end points of each range, the end points of each range and an individual point value, and individual point values can be combined with each other to create one or more new numerical ranges, and these numerical ranges should be considered as specifically disclosed herein.

Figure 2:
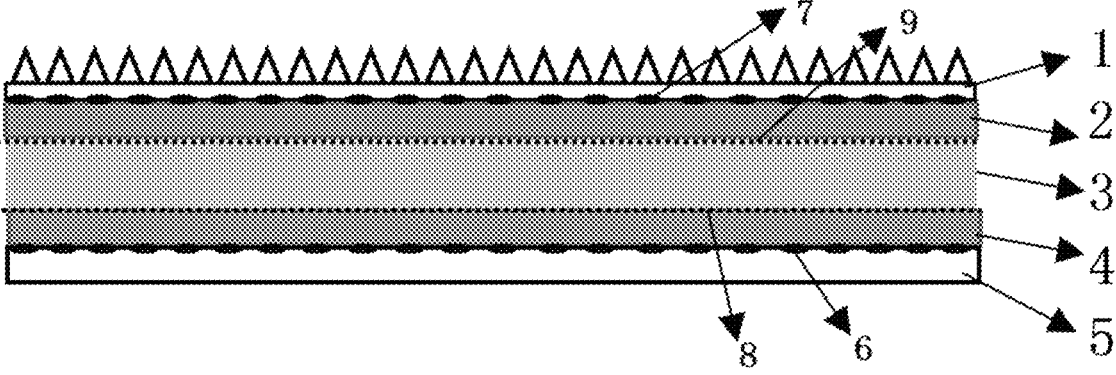
FIG. 2 is another structural schematic diagram of a quantum dot optical plate according to the disclosure.

As described above, some embodiments of the disclosure provide a quantum dot optical plate having high brightness and blocking blue light. As shown in FIGS. 1-2, the quantum dot optical plate includes a light diffusion layer 5, a quantum dot layer 3 and a brightening layer 1 which are arranged in sequence. A first light transition layer 4 is arranged between the quantum dot layer 3 and the light diffusion layer 5, a second light transition layer 2 is arranged between the quantum dot layer 3 and the brightening layer 1, and refractive indexes of the light diffusion layer 5, the first light transition layer 4, the quantum dot layer 3, the second light transition layer 2 and the brightening layer 1 satisfy: $t_{light\ diffusion\ layer} \leq t_{first\ light\ transition\ layer} \leq t_{quantum\ dot\ layer} \leq t_{second\ light\ transition\ layer} \leq t_{brightening\ layer}$. A first rough particle 6 is laid between the light diffusion layer 5 and the first light transition layer 4, and a second rough particle 7 is laid between the brightening layer 1 and the second light transition layer 2.

In the disclosure, "light transition layer" is understood as a gradual transition layer that has variable light refractive indexes, and is configured to increase light transmittance and reduce light reflection caused by a refractive index difference at a place where a plate (that is, the quantum dot layer 3) and a film (that is, the light diffusion layer 5 or the brightening layer 1) are attached to each other. The light reflection will reduce a light utilization rate. In the disclosure, "rough particle" is understood as a granular substance that optimizes light transmission, and is configured to increase roughness of an interface between layers, further reduce light reflection, and enhance a brightening performance and a blue light blockage performance.

In the disclosure, "refractive indexes are substantially the same" is understood to mean that the refractive indexes are the same to the degree of accuracy in the thousandth.

In the disclosure, the first light transition layer 4 and the second light transition layer 2 are particularly provided, and refractive indexes of a plurality of layers of structures are set to increase gradually, such that reflection is reduced when light passes through the plurality of layers of structures. Furthermore, the first rough particle 6 and the second rough particle 7 are laid between the light diffusion layer 5 and the first light transition layer 4 and between the brightening layer 1 and the second light transition layer 2 respectively, such that reflection is further reduced, the brightness is improved, and a blue light blockage effect is enhanced.

In some embodiments, the first light transition layer 4 has a thickness of 0.01 mm-0.25 mm, and the second light transition layer 2 has a thickness of 0.01 mm-0.25 mm. More specifically, the first light transition layer 4 has the thickness of 0.01 mm-0.15 mm, and the second light transition layer 2 has the thickness of 0.01 mm-0.15 mm. It should be understood that the first light transition layer 4 and the second light transition layer 2 is able to have the same thickness or not.

In some embodiments, the quantum dot layer 3 has a thickness of 0.1 mm-1.0 mm. More specifically, the quantum dot layer 3 has the thickness of 0.1 mm-0.7 mm.

In the above solution, a propagation distance of light between the light transition layer and the quantum dot layer 3 is further reduced, the offset distance is even less, and the light utilization rate is increased. The obtained quantum dot optical plate has the comprehensive effects of ultrathin thickness, high brightness and blue light blockage.

The disclosure has no specific limitation on materials of the first light transition layer 4 and the second light transition layer 2, as long as they satisfy the above specific refractive index and are suitable for the optical plate. Substrates for the non-limiting listed light transition layers are selected from polymethyl methacrylate (PMMA), polyethylene terephthalate (PET), polycarbonate (PC), methyl methacrylate-styrene copolymer (MS), polypropylene (PP), and polystyrene (PS).

In some embodiments, a difference between a refractive index of the first rough particle 6 and a refractive index of the first light transition layer 4 is less than 0.01. More specifically, the refractive index of the first rough particle 6 and the refractive index of the first light transition layer 4 are substantially the same.

In some embodiments, a difference between a refractive index of the second rough particle 7 and a refractive index of the brightening layer 1 is less than 0.01, More specifically, the refractive index of the second rough particle 7 and the refractive index of the brightening layer 1 are substantially the same.

In the above solution, the reason for reducing the refractive index difference between the first rough particle 6 and/or the second rough particle 7 and the adjacent layer is to reduce light reflection when the light enters the next layer through the rough particle.

In the disclosure, materials of the first rough particle 6 and the second rough particle 7 are not particularly limited. For simplifying a process and reducing a refractive index difference, in some embodiments, the first rough particle 6 is made of the same resin material as a substrate of the first light transition layer 4. In some embodiments, the second rough particle 7 is made of the same resin material as a substrate of the brightening layer 1.

In the disclosure, a particle size of the rough particle is not particularly limited as long as the rough particle is able to increase the roughness of the interface. Specifically, the particle size of the added rough particle is related to a refractive index difference between the transition layer and the adjacent optical film material, and the larger the refractive index difference between adjacent layers is, the larger the size of the selected rough particle is. Because of differences in physical properties and in transparency between materials, the larger the refractive index difference is, the more likely the light is reflected at a flat interface, such that increasing the particle size of the rough particle according to the refractive index difference is able to further increase the roughness and reduce reflection. According to the research of the applicant, when the refractive index difference of adjacent layers increases, an offset distance of light reduces, and a single flat interface is more prone to reflection. Reflection is reduced by using large-particle-size rough particle, and the light utilization rate is able to be greatly increased by a synergistic effect of the layout of refractive index change trend and laying the rough particle. Under the condition that the refractive index difference between adjacent layers is small, an offset distance of light is large, then reflection of a flat interface is reduced, and an influence of the particle size of the rough particle on the reflection is also reduced.

In some embodiments, when a refractive index difference between the light diffusion layer 5 and the first light transition layer 4 satisfies 0.1≤δt≤0.2, the first rough particle 6 has a particle size range of 0.1 mm-0.2 mm; when the refractive index difference between the light diffusion layer 5 and the first light transition layer 4 satisfies 0.01<δt<0.1, the first rough particle 6 has a particle size range of 0.01 mm-0.2 mm; and when the refractive index difference between the light diffusion layer 5 and the first light transition layer 4 satisfies δt≤0.01, the first rough particle 6 has a particle size range of 0.001 mm-0.2 mm.

In some embodiments, when a refractive index difference between the brightening layer 1 and the second light transition layer 2 satisfies 0.1≤δt≤0.2, the second rough particle 7 has a particle size range of 0.1 mm-0.2 mm; when the refractive index difference between the brightening layer 1 and the second light transition layer 2 satisfies 0.01<δt<0.1, the second rough particle 7 has a particle size range of 0.01 mm-0.2 mm; and when the refractive index difference between the brightening layer 1 and the second light transition layer 2 satisfies δt≤0.01, the second rough particle 7 has a particle size range of 0.001 mm-0.2 mm.

In the above solution, a brightening performance and/or blue light blockage performance of the quantum dot optical plate are further improved.

FIG. 2 shows another embodiment of the disclosure. A first quantum dot layer rough particle 8 is laid between the quantum dot layer 3 and the first light transition layer 4. A second quantum dot layer rough particle 9 is laid between the quantum dot layer 3 and the second light transition layer 2.

In other embodiments not shown in the figures, the first quantum dot layer rough particle 8 is only laid between the quantum dot layer 3 and the first light transition layer 4.

In other embodiments not shown in the figures, the second quantum dot layer rough particle 9 is only laid between the quantum dot layer 3 and the second light transition layer 4.

In the above solution provided with the first quantum dot layer rough particle 8 and/or the second quantum dot layer rough particle 9, the roughness of the interface is further increased, such that reflection is reduced when light passes through a corresponding interface, the light loss is further reduced, and the blue light blockage effect is enhanced.

In some embodiments, a difference between a refractive index of the first quantum dot layer rough particle 8 and a refractive index of a substrate of the quantum dot layer 3 is less than 0.01. More specifically, the refractive index of the first quantum dot layer rough particle 8 and the refractive index of the substrate of the quantum dot layer 9 are basically the same. A difference between a refractive index of the second quantum dot layer rough particle 9 and a refractive index of the second light transition layer 2 is less than 0.01. More specifically, the refractive index of the second quantum dot layer rough particle 9 and the refractive index of the second light transition layer 2 are basically the same.

The reason for reducing the refractive index difference between the first quantum dot layer rough particle 8 and/or the second quantum dot layer rough particle 9 and the adjacent layer is to reduce light reflection when the light enters the next layer through the rough particle.

A particle size of the first quantum dot layer rough particle 8 and/or the second quantum dot layer rough particle 9 provided is related to the refractive index difference between the quantum dot layer 3 and the adjacent transition layer, as is the case with the first rough particle 6 and the second rough particle 7.

In some embodiments, when a refractive index difference between the quantum dot layer 3 and the first light transition layer 4 satisfies $0.1 \leq \delta t \leq 0.2$, the first quantum dot layer rough particle 8 has a particle size range of 0.1 mm-0.2 mm; when the refractive index difference between the quantum dot layer 3 and the first light transition layer 4 satisfies $0.01 < \delta t < 0.1$, the first quantum dot layer rough particle 8 has a particle size range of 0.01 mm-0.2 mm; and when the refractive index difference between the quantum dot layer 3 and the first light transition layer 4 satisfies $\delta t \leq 0.01$, the first quantum dot layer rough particle 8 has a particle size range of 0.001 mm-0.2 mm.

In some embodiments, when a refractive index difference between the quantum dot layer 3 and the second light transition layer 2 satisfies $0.1 \leq \delta t \leq 0.2$, the second quantum dot layer rough particle 9 has a particle size range of 0.1 mm-0.2 mm; when the refractive index difference between the quantum dot layer 3 and the second light transition layer 2 satisfies $0.01 < \delta t < 0.1$, the second quantum dot layer rough particle 9 has a particle size range of 0.01 mm-0.2 mm; and when the refractive index difference between the quantum dot layer 3 and the second light transition layer 2 satisfies $\delta t \leq 0.01$, the second quantum dot layer rough particle 9 has a particle size range of 0.001 mm-0.2 mm.

In the above solution, a brightening performance and/or blue light blockage performance of the quantum dot optical plate are further improved.

In the disclosure, materials of the first quantum dot layer rough particle 8 and the second quantum dot layer rough particle 9 are not particularly limited. For simplifying a process and reducing a refractive index difference, in some embodiments, the first quantum dot layer rough particle 8 is made of the same resin material as the substrate of the quantum dot layer 3, and/or the second quantum dot layer rough particle 9 is made of the same resin material as the substrate of the quantum dot layer 3. The non-limiting listed resin material is selected from PS, PMMA, PC, MS, PET, and PP.

In some embodiments, the quantum dot optical plate has a thickness of 0.2 mm-2 mm. More specifically, 0.5 mm-1.5 mm. The above thickness is significantly less than that of an existing quantum dot optical functional plate. In this solution, when light passes through different media, a propagation distance and an offset distance are shorter, such that the light is able to enter the brightening layer 1 more intensively, and then is emitted after being gathered by the brightening layer 1, thereby achieving a better brightening effect.

In the disclosure, it should be understandable that the composition and structure of the brightening layer 1 and the light diffusion layer 5 are not particularly limited as long as the layers implement light diffusion and brightening. In some embodiments, the brightening layer 1 has a prism structure, and as shown in FIGS. 1 and 2, the prism structure is able to gather scattered light, to further enhance light intensity.

In the quantum dot optical plate of the disclosure, a structure between the quantum dot layer 3 and the light diffusion layer 5 is able to effectively improve the blue light blockage performance, and a structure between the quantum dot layer 3 and the brightening layer 1 is able to effectively improve the brightness. According to the quantum dot optical plate in the disclosure, the light diffusion layer 5, the brightening layer 1 and the quantum dot layer 3 are integrated into a whole, the light utilization rate is increased by optimizing a propagation path of light in each layer, the brightness and the blue light blockage effect are improved, and moreover, an assembly process of a manufacturer with less terminal apparatuses is met, and a foundation is laid for intelligent manufacturing.

The disclosure does not particularly limit a preparation method for the quantum dot optical plate as long as the quantum dot optical plate having the above specific structure is formed.

Some other embodiments of the disclosure provide a preparation method for the above quantum dot optical plate having high brightness and blocking blue light, including:

step (1), measuring refractive indexes of a quantum dot layer 3, a light diffusion layer 5 and a brightening layer 1, and selecting a photocurable adhesive and/or a hot melt adhesive as a first light transition layer adhesive and a second light transition layer adhesive according to a measurement result of the refractive indexes;

step (2): coating the quantum dot layer 3 with the adhesive layer by layer, to form the first light transition layer 4 and the second light transition layer 2 that have variable light refractive indexes;

step (3): laying the first rough particle 6 on the first light transition layer 4, and laying the second rough particle 7 on the second light transition layer 2; and step (4): attaching the light diffusion layer 5 to the first light transition layer 4, attaching the brightening layer 1 to the second light transition layer 2, and performing ultraviolet curing and/or hot curing.

In the disclosure, the quantum dot layer 3, the light diffusion layer 5, and the brightening layer 1 are all in the related art, and those skilled in the art freely select them according to needs, which is not limited in the disclosure. The thicknesses of the quantum dot layer 3, the light diffusion layer 5, and the brightening layer 1 satisfy a desired thickness of the quantum dot optical plate.

In step (1) of the disclosure, "selecting a photocurable adhesive and/or a hot melt adhesive as a first light transition layer adhesive and a second light transition layer adhesive according to a measurement result of the refractive indexes" refers to selecting the adhesive whose refractive index after curing are able to satisfy a refractive index limit of each layer of the quantum dot optical plate above.

In step (2), it should be understood that the adhesive refers to the first light transition layer adhesive and the second light transition layer adhesive. The amount and coating thicknesses of the first light transition layer adhesive and the second light transition layer adhesive are able to satisfy requirements of the first light transition layer 4 and the second light transition layer 2 in the quantum dot optical plate with a preset structure.

In step (2), there is no limitation on the way of coating the adhesive, and a non-limiting listed coating way is spraying or rolling.

In some embodiments, between step (1) and step (2), the preparation method further includes: laying the first quantum dot layer rough particle 8 or the second quantum dot layer rough particle 9 on a single side of the quantum dot layer 3; or, laying the first quantum dot layer rough particle 8 and the second quantum dot layer rough particle 9 on two sides of the quantum dot layer 3 respectively.

The disclosure further provides a backlight module, including the above quantum dot optical plate having high brightness and blocking blue light.

The quantum dot optical plate in the disclosure is suitable for an edge-lit or direct-lit backlight module and has a wide application range. In the related art, an application terminal of the quantum dot backlight module is mainly limited to a television and a computer monitor. The quantum dot optical plate backlight module in the disclosure is popularized to terminals of a notebook computer, a Pad, a mobile phone, etc. besides the television and the computer monitor.

The disclosure will be further elaborated hereafter in conjunction with examples.

Example 1

A quantum dot optical plate includes a light diffusion layer 5, a quantum dot layer 3 and a brightening layer 1 which are arranged in sequence. A first light transition layer 4 is arranged between the quantum dot layer 3 and the light diffusion layer 5, and a second light transition layer 2 is arranged between the quantum dot layer 3 and the brightening layer 1. A first rough particle 6 is laid between the light diffusion layer 5 and the first light transition layer 4, and a second rough particle 7 is laid between the brightening layer 1 and the second light transition layer 2. The first light transition layer 4 and the second light transition layer 2 are formed by curing acrylic resin-based adhesive. The first rough particle 6 is acrylic resin powder, and the second rough particle 7 is PET powder.

Specifically, the light diffusion layer 5 is made of PET, the quantum dot layer 3 is made of PS, and the brightening layer 1 is made of PET.

A refractive index of the light diffusion layer 5 is 1.42, a refractive index of the first light transition layer 4 is 1.46, a refractive index of the quantum dot layer 3 is 1.52, a refractive index of the second light transition layer 2 is 1.56, and a refractive index of the brightening layer 1 is 1.59. The first rough particle 6 has a particle size of 0.008 mm, and the second rough particle 7 has a particle size of 0.008 mm.

The quantum dot optical plate in the example is placed in a backlight module with the same blue light power, and blue light intensity and brightness values are measured by a blue light irradiance meter and a color analyzer at the center of a plate separately.

An original model optical plate is formed by directly stacking a PET light diffusion layer, a PS quantum dot layer and a PET brightening layer which are arranged in sequence, and a refractive index of the light diffusion layer is 1.59, a refractive index of the quantum dot layer is 1.52, and a refractive index of the brightening layer is 1.59.

The measured blue light intensity and brightness values are compared with data obtained from an original model test, and it is confirmed that the brightness is increased by 6.12%, and the blue light intensity is decreased by 5.08%.

Example 2

Compared with the quantum dot optical plate in Example 1, the difference only lies in that the first rough particle 6 has a particle size of 0.1 mm.

Tested brightness and blue light intensity data are compared with an original model, and it is confirmed that brightness is increased by 8.14%, and blue light intensity is decreased by 9.05%.

Example 3

Compared with the quantum dot optical plate in Example 1, the difference only lies in that the second rough particle 7 has a particle size of 0.1 mm.

Tested brightness and blue light intensity data are compared with an original model, and it is confirmed that brightness is increased by 10.02%, and blue light intensity is decreased by 5.10%.

Example 4

Compared with the quantum dot optical plate in Example 1, the difference only lies in that the first rough particle 6 has a particle size of 0.1 mm, and the second rough particle 7 has a particle size of 0.1 mm.

Tested brightness and blue light intensity data are compared with an original model, and it is confirmed that brightness is increased by 12.25%, and blue light intensity is decreased by 9.11%.

Example 5

Compared with the quantum dot optical plate in Example 4, the difference lies in that a first quantum dot layer rough particle 8 and a second quantum dot layer rough particle 9 are laid on two sides of the quantum dot layer 3, and the first quantum dot layer rough particle 8 is PS resin powder and has a particle size of 0.009 mm. The second quantum dot layer rough particle 9 is acrylic resin powder, and has a particle size of 0.009 mm.

Tested brightness and blue light intensity data are compared with an original model, and it is confirmed that brightness is increased by 14.21%, and blue light intensity is decreased by 11.37%.

Example 6

Compared with the quantum dot optical plate in Example 5, the difference lies in that the first quantum dot layer rough particle 8 has a particle size of 0.12 mm.

Tested brightness and blue light intensity data are compared with an original model, and it is confirmed that brightness is increased by 15.98%, and blue light intensity is decreased by 14.95%.

Example 7

Compared with the quantum dot optical plate in Example 5, the difference lies in that the second quantum dot layer rough particle 9 has a particle size of 0.12 mm.

Tested brightness and blue light intensity data are compared with an original model, and it is confirmed that brightness is increased by 18.19%, and blue light intensity is decreased by 11.33%.

Example 8

Compared with the quantum dot optical plate in Example 5, the difference lies in that the first quantum dot layer rough particle 8 has a particle size of 0.12 mm, and the second quantum dot layer rough particle 9 has a particle size of 0.12 mm.

Tested brightness and blue light intensity data are compared with an original model, and it is confirmed that brightness is increased by 19.95%, and blue light intensity is decreased by 14.91%.

Comparative Example 1

A quantum dot optical plate includes a light diffusion layer 5 with a substrate of PET resin, a quantum dot layer 3 with a substrate of PS resin, and a brightening layer 1 with a substrate of PET resin which are arranged in sequence.

A refractive index of the light diffusion layer 5 is 1.42, a refractive index of the quantum dot layer 3 is 1.52, and a refractive index of the brightening layer 1 is 1.59.

Tested brightness and blue light intensity data are compared with an original model, and it is confirmed that brightness is increased by 2.86%, and blue light intensity is decreased by 2.98%.

Comparative Example 2

A quantum dot optical plate includes a light diffusion layer 5 with a substrate of PET resin, a quantum dot layer 3 with a substrate of PS resin, and a brightening layer 1 with a substrate of PET resin which are arranged in sequence. A first light transition layer 4 is arranged between the quantum dot layer 3 and the light diffusion layer 5, and a second light transition layer 2 is arranged between the quantum dot layer 3 and the brightening layer 1. A first rough particle 6 is laid between the light diffusion layer 5 and the first light transition layer 4, and a second rough particle 7 is laid between the brightening layer 1 and the second light transition layer 2. The first rough particle 6 has a particle size of 0.008 mm, and the second rough particle 7 has a particle size of 0.008 mm. A refractive index of the light diffusion layer 5 is 1.59, a refractive index of the first light transition layer 4 is 1.5, a refractive index of the quantum dot layer 3 is 1.52, a refractive index of the second light transition layer 2 is 1.5, and a refractive index of the brightening layer 1 is 1.59.

Tested brightness and blue light intensity data are compared with an original model, and it is confirmed that brightness is increased by 1.23%, and blue light intensity is decreased by 0.98%.

Comparative Example 3

Compared with the quantum dot optical plate in Example 2, the difference lies in that a first quantum dot layer rough particle 8 and a second quantum dot layer rough particle 9 are laid on two sides of the quantum dot layer 3. The first quantum dot layer rough particle 8 is PS resin powder and has a particle size of 0.009 mm; and the second quantum dot layer rough particle 9 is PS resin powder and has a particle size of 0.009 mm.

Tested brightness and blue light intensity data are compared with an original model, and it is confirmed that brightness is increased by 1.99%, and blue light intensity is decreased by 2.05%.

It is seen from comparison of brightness values and blue light intensity reduction values of Examples 1-8 and Comparative examples 1-3 with the original model that the brightness of the optical plate is significantly improved and the blue light intensity is reduced by arranging the light transition layers, the rough particle and making light always propagated from an optically thinner medium to an optically denser medium.

It is seen from comparison between Examples 1~4 and Examples 5-8 that the addition of the first quantum dot layer rough particle 8 and the second quantum dot layer rough particle 9 is able to further improve the brightness value of the optical plate and reduce the blue light intensity.

It is seen from Examples 1-8 that optimization of the particle size of the rough particle is able to significantly optimize the brightness and the blue light blockage performance of the optical plate.

What is claimed is:

1. A quantum dot optical plate having high brightness and blocking blue light, comprising a light diffusion layer, a quantum dot layer and a brightening layer which are arranged in sequence, and a first light transition layer is arranged between the quantum dot layer and the light diffusion layer, a second light transition layer is arranged between the quantum dot layer and the brightening layer, refractive indexes of the light diffusion layer, the first light transition layer, the quantum dot layer, the second light transition layer and the brightening layer satisfy: $t_{light\ diffusion\ layer} \le t_{first\ light\ transition\ layer} \le t_{quantum\ dot\ layer} \le t_{second\ light\ transition\ layer} \le t_{brightening\ layer}$, and a first rough particle is laid between the light diffusion layer and the first light transition layer, a second rough particle is laid between the brightening layer and the second light transition layer.

2. The quantum dot optical plate having high brightness and blocking blue light according to claim 1, wherein the first light transition layer has a thickness of 0.01 mm-0.25 mm, the second light transition layer has a thickness of 0.01 mm-0.25 mm, and the quantum dot layer has a thickness of 0.1 mm-1.0 mm.

3. The quantum dot optical plate having high brightness and blocking blue light according to claim 2, wherein the first light transition layer has the thickness of 0.01 mm-0.15 mm, the second light transition layer has the thickness of 0.01 mm-0.15 mm, and the quantum dot layer has the thickness of 0.1 mm-0.7 mm.

4. The quantum dot optical plate having high brightness and blocking blue light according to claim 1, wherein a difference between a refractive index of the first rough particle and a refractive index of the first light transition layer is less than 0.01.

5. The quantum dot optical plate having high brightness and blocking blue light according to claim 1, wherein a difference between a refractive index of the second rough particle and a refractive index of the brightening layer is less than 0.01.

6. The quantum dot optical plate having high brightness and blocking blue light according to claim 1, wherein the first rough particle is made of the same resin material as a substrate of the first light transition layer.

7. The quantum dot optical plate having high brightness and blocking blue light according to claim 1, wherein the second rough particle is made of the same resin material as a substrate of the brightening layer.

8. The quantum dot optical plate having high brightness and blocking blue light according to claim 1, wherein when a refractive index difference between the light diffusion layer and the first light transition layer satisfies $0.1 \le \delta t \le 0.2$, the first rough particle has a particle size range of 0.1 mm-0.2 mm; when the refractive index difference between the light diffusion layer and the first light transition layer satisfies $0.01 < \delta t < 0.1$, the first rough particle has a particle size range of 0.01 mm-0.2 mm; and when the refractive index difference between the light diffusion layer and the first light transition layer satisfies $\delta t \le 0.01$, the first rough particle has a particle size range of 0.001 mm-0.2 mm.

9. The quantum dot optical plate having high brightness and blocking blue light according to claim 1, wherein when a refractive index difference between the brightening layer and the second light transition layer satisfies $0.1 \le \delta t \le 0.2$, the second rough particle has a particle size range of 0.1 mm-0.2 mm; when the refractive index difference between the brightening layer and the second light transition layer satisfies $0.01 < \delta t < 0.1$, the second rough particle has a particle size range of 0.01 mm-0.2 mm; and when the refractive index difference between the brightening layer and the second light transition layer satisfies δt≤0.01, the second rough particle has a particle size range of 0.001 mm-0.2 mm.

10. The quantum dot optical plate having high brightness and blocking blue light according to claim 1, wherein a first quantum dot layer rough particle is laid between the quantum dot layer and the first light transition layer; and/or, a second quantum dot layer rough particle is laid between the quantum dot layer and the second light transition layer.

11. The quantum dot optical plate having high brightness and blocking blue light according to claim 10, wherein a difference between a refractive index of the first quantum dot layer rough particle and a refractive index of a substrate of the quantum dot layer is less than 0.01, and a difference between a refractive index of the second quantum dot layer rough particle and a refractive index of the second light transition layer is less than 0.01.

12. The quantum dot optical plate having high brightness and blocking blue light according to claim 10, wherein when a refractive index difference between the quantum dot layer and the first light transition layer satisfies 0.1≤δt≤0.2, the first quantum dot layer rough particle has a particle size range of 0.1 mm-0.2 mm; when the refractive index difference between the quantum dot layer and the first light transition layer satisfies 0.01<δt<0.1, the first quantum dot layer rough particle has a particle size range of 0.01 mm-0.2 mm; and when the refractive index difference between the quantum dot layer and the first light transition layer satisfies δt≤0.01, the first quantum dot layer rough particle has a particle size range of 0.001 mm-0.2 mm.

13. The quantum dot optical plate having high brightness and blocking blue light according to claim 10, wherein when a refractive index difference between the quantum dot layer and the second light transition layer satisfies 0.1≤δt≤0.2, the second quantum dot layer rough particle has a particle size of 0.1 mm-0.2 mm; when the refractive index difference between the quantum dot layer and the second light transition layer satisfies 0.01<δt<0.1, the second quantum dot layer rough particle has a particle size of 0.01 mm-0.2 mm; and when the refractive index difference between the quantum dot layer and the second light transition layer satisfies δt≤0.01, the second quantum dot layer rough particle has a particle size of 0.001 mm-0.2 mm.

14. The quantum dot optical plate having high brightness and blocking blue light according to claim 10, wherein the first quantum dot layer rough particle is made of the same resin material as a substrate of the quantum dot layer, and the second quantum dot layer rough particle is made of the same resin material as a substrate of the second light transition layer.

15. The quantum dot optical plate having high brightness and blocking blue light according to claim 1, wherein the quantum dot optical plate blocking blue light has a thickness of 0.2 mm-2 mm.

16. The quantum dot optical plate having high brightness and blocking blue light according to claim 15, wherein the quantum dot optical plate blocking blue light has the thickness of 0.5 mm-1.5 mm.

17. A preparation method for the quantum dot optical plate having high brightness and blocking blue light according to claim 1, comprising:

step (1), measuring refractive indexes of a quantum dot layer, a light diffusion layer and a brightening layer, and selecting a photocurable adhesive and/or a hot melt adhesive as a first light transition layer adhesive and a second light transition layer adhesive according to a measurement result of the refractive indexes;

step (2): coating the quantum dot layer with the adhesive layer by layer, to form a first light transition layer and a second light transition layer that have variable light refractive indexes;

step (3): laying a first rough particle on the first light transition layer, and laying a second rough particle on the second light transition layer; and step (4): attaching the light diffusion layer to the first light transition layer, attaching the brightening layer to the second light transition layer, and performing ultraviolet curing and/or hot curing.

18. The preparation method for the quantum dot optical plate having high brightness and blocking blue light according to claim 17, wherein between step (1) and step (2), the preparation method further comprises:

laying a first quantum dot layer rough particle or a second quantum dot layer rough particle on a single side of the quantum dot layer; or laying the first quantum dot layer rough particle and the second quantum dot layer rough particle on two sides of the quantum dot layer respectively.

19. A backlight module, comprising the quantum dot optical plate having high brightness and blocking blue light according to claim 1.

20. The quantum dot optical plate having high brightness and blocking blue light according to claim 1, wherein the brightening layer has a prism structure.

*   *   *   *   *